US012649448B2

(12) United States Patent
Schmalbruch

(10) Patent No.: US 12,649,448 B2
(45) Date of Patent: Jun. 9, 2026

(54) METHOD FOR OPERATING A BRAKE SYSTEM OF A MOTOR VEHICLE, CONTROL UNIT, AND MOTOR VEHICLE

(71) Applicant: Volkswagen Aktiengesellschaft, Wolfsburg (DE)

(72) Inventor: Michael Schmalbruch, Wolfenbüttel (DE)

(73) Assignee: Volskwagen Aktiengesellschaft, Wolfsburg (DE)

( * ) Notice: Subject to any disclaimer, the term of this patent is extended or adjusted under 35 U.S.C. 154(b) by 736 days.

(21) Appl. No.: 18/084,163

(22) Filed: Dec. 19, 2022

(65) Prior Publication Data

US 2023/0192042 A1     Jun. 22, 2023

(30) Foreign Application Priority Data

Dec. 21, 2021     (DE) .......................... 102021214849.2

(51) Int. Cl.
B60T 8/172 (2006.01)
B60T 17/22 (2006.01)

(52) U.S. Cl.
CPC ............ B60T 8/172 (2013.01); B60T 17/221 (2013.01); B60T 2250/04 (2013.01); B60T 2270/604 (2013.01)

(58) Field of Classification Search
CPC .. B60T 8/172; B60T 17/221; B60T 2270/604; B60T 2250/04; B60T 1/10;

(Continued)

(56) References Cited

U.S. PATENT DOCUMENTS 12,377,831 B2 *   8/2025   Gunselmann ............. B60T 1/10
2010/0276240 A1   11/2010   Wuerth et al.

(Continued)

FOREIGN PATENT DOCUMENTS

CN     103754202 A     4/2014
CN     103754207 A     4/2014

(Continued)

OTHER PUBLICATIONS

German Patent No. DE 102017205810 to Meitinger et al published on Oct. 11, 2018.*

(Continued)

*Primary Examiner* — Pamela Rodriguez
(74) *Attorney, Agent, or Firm* — Peter Zura; LOZA & LOZA, LLP

(57) ABSTRACT

Technologies and techniques for operating a brake system of a motor vehicle, including a friction braking device and a regenerative braking device, in which a need for cleaning of respective wheel brakes of the friction braking device of the motor vehicle is determined. A desired deceleration of the motor vehicle is determined based on a position of a brake pedal that is mechanically decoupled from the friction braking device. A braking force that is required for the desired deceleration of the motor vehicle is determined, and a first, predefined portion of this braking force being allocated to the regenerative braking device and the remainder of the required braking force being allocated among the wheel brakes of the friction braking device. The braking force to be provided may be distributed among the wheel brakes as a function of the determined need for cleaning of the respective wheel brakes.

20 Claims, 1 Drawing Sheet

(58) Field of Classification Search
CPC .......... B60T 8/17; B60T 8/171; B60T 8/4072; B60T 13/66; B60T 2270/82; B60T 2201/124; B60L 7/10
See application file for complete search history.

(56) References Cited

U.S. PATENT DOCUMENTS

| | | | | |
|---|---|---|---|---|
| 2013/0151103 | A1* | 6/2013 | Enders | B60L 7/18 |
| | | | | 701/70 |
| 2014/0229045 | A1* | 8/2014 | Borchers | F16D 65/0037 |
| | | | | 701/22 |
| 2020/0079219 | A1 | 3/2020 | Okubo | |
| 2021/0170878 | A1* | 6/2021 | Straßer | B60L 7/26 |

FOREIGN PATENT DOCUMENTS

| | | |
|---|---|---|
| DE | 102011103660 A1 | 12/2012 |
| DE | 102011120791 A1 | 6/2013 |
| DE | 102013216314 A1 | 2/2015 |
| DE | 102013224143 A1 | 5/2015 |
| DE | 102015220567 A1 | 4/2017 |
| DE | 102016007436 A1 | 12/2017 |
| DE | 102016217680 A1 | 3/2018 |
| DE | 102016217681 A1 | 3/2018 |
| DE | 102016222504 A1 | 5/2018 |
| DE | 102017207474 A1 | 11/2018 |
| DE | 102018209311 A1 | 12/2019 |
| DE | 102020204345 A1 | 10/2020 |
| WO | 2018177785 A1 | 10/2018 |
| WO | 2019197084 A1 | 10/2019 |

OTHER PUBLICATIONS

European Patent No. EP 22203565 Examination Report (May 2, 2023).
German Appln. No. DE102021214849.2. Examination Report (Aug. 12, 2022).

* cited by examiner

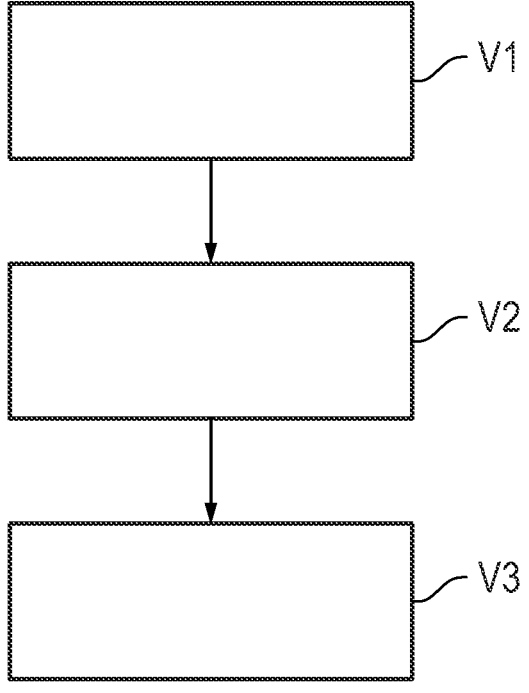

METHOD FOR OPERATING A BRAKE SYSTEM OF A MOTOR VEHICLE, CONTROL UNIT, AND MOTOR VEHICLE

The present application claims priority to German Patent App. No. 10 2021 214 849.2, to Schmalbruch, et al., filed on Dec. 21, 2021, the contents of which is incorporated by reference in its entirety herein.

TECHNICAL FIELD

The present disclosure relates to technologies and techniques for operating a brake system of a motor vehicle.

BACKGROUND

A method for controlling a brake system for a vehicle is known from US 2010/0276240 A1. In the method, a master brake cylinder is separated from a wheel brake cylinder by means of a separator valve. The master brake cylinder is configured to detect an actuation of a brake input element. An inflow of a braking medium from a reservoir to a wheel brake cylinder is controlled by means of a control valve, whereby a braking pressure at an assigned wheel is adjusted.

SUMMARY

Aspects of the present invention are directed to a solution that makes it possible to clean respective wheel brakes of a motor vehicle, while recovering a particularly high amount of braking energy, wherein a brake pedal feel of a driver is minimally influenced.

Some aspects are achieved by the subject matter of the independent claim. Other aspects of the present disclosure are disclosed in the dependent claims, the description, and the FIGURES.

In some examples, a method is disclosed for operating a brake system of a motor vehicle. The brake system of the motor vehicle may include a friction braking device and a regenerative braking device. The friction braking device is configured to convert kinetic energy of the motor vehicle into thermal energy by way of friction. The friction braking device includes a wheel brake, configured in each case as a friction brake, for each wheel of the motor vehicle. The respective wheel brakes can be configured as disk brakes or drum brakes, for example. The regenerative braking device is configured to convert kinetic energy of the motor vehicle into electrical energy. For this purpose, the regenerative braking device can comprise a generator. In particular in the case of vehicles comprising a regenerative brake, respective wheel brakes are used to a considerably lesser extent for deceleration than in vehicles that are decelerated exclusively by way of friction brakes. This can result, quickly and frequently, in less-than-optimal friction coefficient conditions at the wheel brakes, as a result of the occurrence of corrosion, which can adversely affect the braking behavior, including acoustics of the vehicle. This may possibly cause the friction brakes to have to be replaced particularly frequently. When a regenerative braking proportion is decreased in favor of an increased hydraulic braking proportion, this results in an increase in the consumption of the motor vehicle.

To be able to avoid these disadvantages, it is provided in the method that a need for cleaning of respective wheel brakes of the friction braking device of the motor vehicle is determined. This need for cleaning can result, for example, due to corrosion of the respective wheel brakes. This means that the respective wheel brakes are to be cleaned when they exhibit a certain degree of corrosion. It is furthermore provided in the method that a deceleration of the motor vehicle desired by the driver is determined based on a brake pedal position of a brake pedal that is mechanically decoupled from the friction braking device, and that a braking force required for the desired deceleration of the motor vehicle is determined.

The brake pedal position can be determined, for example, by means of a sensor device. By adjusting the brake pedal, the driver can thus predefine how strongly the motor vehicle is to be decelerated. The mechanical decoupling of the brake pedal from the friction braking device shall be understood to mean that the brake pedal is not directly coupled to the particular wheel brakes by way of the hydraulic system. This means that a displacement of brake fluid directly by means of the brake pedal in a hydraulic brake circuit that is connected to the wheel brake is dispensed with. Instead, a control signal is generated, as a function of a position of the brake pedal, which predefines a hydraulic pressure to be applied to the wheel brakes. This hydraulic pressure is adjusted by means of an actuator when the control signal is received.

Further features of the present disclosure can be derived from the following description of the FIGURE and based on drawing. The features and feature combinations mentioned herein in the description, and the features and feature combinations shown hereafter in the description of the FIGURE and/or shown only in the FIGURE, can be used not only in the respectively indicated combination, but also in other combinations, or alone, without departing from the scope of the present disclosure.

BRIEF DESCRIPTION OF THE DRAWINGS

The drawing shows, in the FIGURE, a schematic diagram for a method for operating a braking system of a motor vehicle.

In FIG. 1, a schematic diagram is shown for operating a braking system of a motor vehicle, wherein the braking system comprises a friction braking device and a regenerative braking device. The friction braking device is configured to decelerate the motor vehicle by way of respective wheel brakes, which are assigned to respective wheels of the motor vehicle and are referred to hereafter as wheel brakes. The regenerative braking device is configured to decelerate the motor vehicle, wherein kinetic energy of the motor vehicle during the deceleration is converted into electrical energy by way of the regenerative braking device, which can, in turn, be stored in a battery of the motor vehicle. In this way, the motor vehicle can be driven particularly energy-efficiently, using the energy stored in the battery of the motor vehicle by means of the regenerative braking device.

DETAILED DESCRIPTION

In some examples, a first, predefined portion of the braking force required for the desired deceleration of the motor vehicle is allocated to the regenerative braking device, and the remainder of this required braking force is allocated to the friction braking device. The motor vehicle is thus decelerated both by the regenerative braking device and by the friction braking device. In the process, the braking force provided by the friction braking device is distributed among the wheel brakes as a function of the determined need for cleaning of the respective wheel brakes. The friction braking device can include respective hydraulic brakes, for example, wherein one hydraulic brake is assigned to each wheel of the motor vehicle. For allocating the braking force among the wheel brakes, a respective braking pressure at the wheel brakes can be adjusted by way of a hydraulic fluid. The higher a particular need for cleaning of a particular wheel brake is, the greater is the proportion of the remainder of the required braking force at this wheel brake in order to clean this wheel brake by the application of the braking force, and in particular to free it from the occurrence of corrosion. In particular, the brake system can be operated in a cleaning mode, in which the need for cleaning of the respective wheel brakes is determined, and the remainder of the required braking force is allocated among the wheel brakes of the friction braking device as a function of the determined need for cleaning.

Such methods thus make it possible for a particularly large proportion of braking energy to be recovered by way of the regenerative braking device, and in this way the motor vehicle can be operated particularly efficiently and with a particularly low demand for energy, and additionally for targeted cleaning of respective wheel brakes of the brake system to be enabled through the allocation of the braking force. A pedal feel disadvantage, due to differing allocations of the braking force in each case to the respective wheel brakes as a function of the respective need for cleaning of the wheel brakes, can be avoided by mechanically decoupling the brake pedal from the friction braking device. In this way, the driving comfort may be particularly high for vehicle occupants of the motor vehicle, regardless of the particular allocation of the braking force between the regenerative braking device and the friction braking device, or among the respective wheel brakes of the friction braking device.

In some examples, a hydraulic braking pressure to be applied to a particular wheel brake for adjusting the brake force is determined as a function of the braking force assigned to the particular wheel brake by way of a stored assignment rule, and that this determined braking pressure is applied to the assigned wheel brake. A characteristic map may be stored and thus saved for each wheel brake as an assignment rule, in which a relationship is predefined between the particular hydraulic braking pressure applied to the wheel brake and the braking force resulting at the particular wheel brake in the form of braking torque. Consequently, it is determined what proportion of the braking force that is required for the desired deceleration is to be applied to the particular wheel brake based on the allocation. Using the assignment rule, the level of hydraulic braking pressure is determined which is to be applied to this wheel brake to achieve that the determined braking force proportion acts at this wheel brake. Thereafter, this determined hydraulic braking pressure is applied to the assigned wheel brake.

For the allocation of the remainder of the required braking force, which is intended for the friction braking device, among the wheel brakes, respective wheel brakes are selected based on the particular need for cleaning, and the selected wheel brakes are assigned the respective braking force proportion thereof. The sum of the braking force proportions of all selected wheel brakes together with the first portion of the required braking force assigned to the regenerative braking device corresponds to the overall braking force that is required for the desired deceleration of the motor vehicle. Using the assignment rule, it is possible to determine more precisely what level of hydraulic braking pressure is to be applied to the particular wheel brake to achieve that the braking force proportion predefined for the wheel brake acts at this wheel brake.

This hydraulic braking pressure can be adjusted by means of an actuator at the respective wheel brake. In this way, it is made possible that the brake pedal is mechanically decoupled from the adjustment of the hydraulic braking pressure at the respective wheel brakes. As a result, for a fixed required braking force, a brake pedal position and a brake pedal resistance of the brake pedal are independent of the allocation of the braking force between the friction braking device and the regenerative braking device as well as independent of an allocation of the braking force among the respective wheel brakes. In this way, the driver cannot feel differences at the brake pedal for respective differing allocations of the required braking force. Consequently, pedal feel disadvantages are minimized or eliminated.

In some examples, the braking force allocated among the wheel brakes of the friction braking device is allocated among the wheel brakes as a function of at least one predefined stability criterion to be adhered to. The predefined stability criterion can predefine respective ranges for ratios of braking force proportions applied by the respective wheel brakes compared to the respective wheel brakes among one another. This means that it is predefined by the stability criterion how much the braking force proportions applied to differing wheel brakes are allowed to differ from one another. The maximum differences can be predefined in absolute or relative terms. By the adherence to the predefined stability criterion, it can be ensured that the vehicle is prevented from breaking away. In this way, it is made possible that a stability of the motor vehicle during deceleration is negatively influenced only to a minimal degree.

In some examples, the at least one stability criterion is adhered to when the respective braking force assigned to the wheel brakes corresponds to no more than a maximum braking force for the particular wheel brake and/or a braking force ratio between respective wheel brakes is within a permitted range for this braking force ratio. In other words, application parameters can be predefined, which predefine limit values or parameters for the braking force distribution among the wheel brakes. An individual maximum braking force can be predefined for each wheel brake, or a maximum braking force can be predefined, which is to be adhered to for each of the wheel brakes. The permitted range for the braking force ratio between the respective wheel brakes predefines how much the respective braking force proportions of the individual wheel brakes are permitted to differ from one another. If the differences between the particular braking force proportions applied to the wheel brakes are too large, the motor vehicle's driving dynamics may be adversely affected. This influence of the driving dynamics may cause the motor vehicle to break away or to depart from a traffic lane. Adherence to the stability criterion enables a particularly safe operation of the motor vehicle.

In some examples, in the event of an intervention by an anti-lock braking system and/or an electronic stability control program, serving as vehicle dynamics control systems, into the motor vehicle's driving dynamics, the allocation of the braking force between the regenerative braking device and the friction braking device and/or among the wheel brakes are predefined by the vehicle dynamics control system. This means that the respective vehicle dynamics control system has a higher priority than the allocation of the required braking force that is carried out as a function of the need for cleaning. As soon as the particular vehicle dynamics control system intervenes into the braking process of the motor vehicle for stabilization, the allocation of the braking force between the regenerative braking device and the friction braking device and/or among the wheel brakes are predefined by the vehicle dynamics control system.

The vehicle dynamics system can predefine absolute values for the respective braking force proportions and/or limit values or parameters for the allocation of the braking force. During braking of the motor vehicle, the anti-lock braking system (ABS) counteracts potential locking of the wheels resulting from the reduction in the brake pressure. In this way, it is made possible that the steerability and directional stability of the motor vehicle are preserved during braking. Using the ABS, complete locking of the wheels of the motor vehicle is avoided. Slip may be adjusted in the process, which predefines to what extent respective wheel revolutions in relation to the overall distance that was covered deviate. This means that the ABS predefines during a braking process how far the wheels roll, and for what distance the wheels lock completely during braking. The ABS may be additionally configured to carry out a braking force allocation among wheels of the front axle and wheels of the rear axle. The electronic stability control program (ESP) refers to an electronically controlled driver assistance system for motor vehicles, which counteracts the break-away of the motor vehicle by deliberately decelerating individual wheels by way of the respective assigned wheel brakes. By deliberately decelerating individual wheels of the motor vehicle, the ESP counteracts skidding of the motor vehicle in the limit range when negotiating curves, both during oversteering and during understeering, whereby a driver of the motor vehicle can be assured control over the motor vehicle.

In some examples, oversteering may be corrected by decelerating a front wheel on the outside of the curve, while understeering is corrected by decelerating a rear wheel on the inside of the curve. In this way, the ESP predefines the respective braking force proportions for the wheel brakes so as to stabilize the motor vehicle. If break-away of the motor vehicle is detected, for example by means of the ESP, the braking force allocation determined as a function of the need for cleaning of the wheel brakes is discarded, and instead the braking force is allocated among the wheel brakes by the ESP. For this purpose, the ESP can predefine an allocation of the braking force between the regenerative braking device and the friction braking device and/or among the wheel brakes. It is possible for the ESP to allocate the required braking force, as determined as a function of the brake pedal position, or for the ESP to predefine the braking force to be implemented, which deviates from the required braking force, as determined as a function of the brake pedal position. Particularly high stability of the driving dynamics of the motor vehicle can be achieved in that the braking force allocation is predefined by the activated vehicle dynamics control system.

In some examples, the braking force allocated among the wheel brakes may be evenly distributed among all wheel brakes, when it is established that no need for cleaning exists. In other words, a particular braking force proportion is provided for each of the wheel brakes, which is identical for all wheel brakes. In this way, a particularly uniform deceleration of the motor vehicle can be achieved, and a risk of the motor vehicle pulling to one side during braking can be kept particularly low.

In some examples, a maximum possible regenerative power of the regenerative braking device is selected as the first predefined portion of the braking force. In this way, a particularly large amount of energy is recovered by way of regeneration during the deceleration of the motor vehicle, whereby the motor vehicle can be operated particularly efficiently and with particularly low fuel consumption. A regenerative capacity of the regenerative braking device is thus fully utilized to access the maximum possible regenerative power of the regenerative braking device.

In some examples, if the braking force that is required for the predefined deceleration of the motor vehicle is smaller than or equal to the maximum possible regenerative power of the regenerative braking device, and if the need for cleaning has been determined, a regenerative power lower than the maximum possible regenerative power of the regenerative braking device is selected as the first predefined portion of the braking force, and the remainder of the required braking force is allocated to the friction braking device. If the braking force required for the predefined deceleration of the motor vehicle is smaller than or equal to the maximum possible regenerative power of the regenerative braking device, and if the maximum possible regenerative power of the regenerative braking device were selected as the first predefined portion of the braking force, the braking force available for the regenerative braking device would be equal to 0. As a result, cleaning of the wheel brakes of the friction braking device could not take place.

For this reason, as soon as the need for cleaning has been determined, a regenerative power lower than the maximum possible regenerative power of the regenerative braking device is selected as the first predefined portion of the braking force, provided the braking force required for the predefined deceleration of the motor vehicle is smaller than or equal to the maximum possible regenerative power. If the braking force required for the predefined deceleration of the motor vehicle is greater than the maximum possible regenerative power of the regenerative braking device, the maximum possible regenerative power of the regenerative braking device can be selected as the first predefined portion of the braking force. In other words, a case-by-case distinction takes place. If it is established that regenerative braking alone suffices for the predefined deceleration of the motor vehicle, however at least one of the wheel brakes is soiled and thus has a need for cleaning, deceleration takes place less by way of the regenerative braking device than would be possible by way of the maximum possible regenerative power of the regenerative braking device, wherein the motor vehicle is additionally decelerated by means of the friction braking device using hydraulic braking.

In a second case, the regenerative braking is not sufficient to decelerate the motor vehicle by the predefined deceleration, with the remainder of the required braking force being provided by the friction braking device, wherein this braking force is distributed among the wheel brakes as a function of the respective need for cleaning of the respective wheel brakes. A regeneration target of the method is to be able to recover a particularly large percentage of braking force by way of regenerative power. To achieve this regeneration target, the braking force is allocated between the friction braking device and the regenerative braking device, wherein, in addition to cleaning at least one wheel brake, as much braking force as possible is to be recovered by way of the regenerative braking device. In this way, the motor vehicle can be operated particularly energy-efficiently.

In some examples, a larger proportion of the braking force of the friction braking device is distributed among wheel brakes of all rear wheels of the motor vehicle compared to wheel brakes of all front wheels. If the motor vehicle is a motorcycle, it is possible for the larger proportion of the braking force of the friction braking device to be allocated to the wheel brake of the rear wheel of the motorcycle compared to the wheel brake of the front wheel of the motorcycle. However, if the motor vehicle is an automobile, it is provided that the larger proportion of the braking force of the friction braking device is be distributed among the wheel brake of the two rear wheels of the motor vehicle compared to the wheel brakes of the front wheels. In particular disk brakes at a rear axle of the motor vehicle have a particularly high need for cleaning since they experience less energy input than front wheel brakes during regular operation by the customer. By allocating the larger proportion of the braking force of the friction braking device among the wheel brakes of all rear wheels of the motor vehicle compared to the wheel brakes of the front wheels of the motor vehicle, reliable cleaning of the wheel brakes of respective rear wheels of the motor vehicle can be carried out.

In some examples, the need for cleaning of the respective wheel brakes is determined by way of a model as a function of the braking frequency and the braking pressure that is applied to the respective wheel brakes, in particular the braking frequency and the braking pressure that is applied to the respective wheel brakes over the service life thereof. The model can thus be a kind of energy computer, which can continually compute over an operating life of the respective wheel brakes when and at which wheel brake, and for how long, braking has occurred based on a respective braking force input of a particular wheel brake, and accordingly how corrosion development is progressing at the respective wheel brakes. By way of the model, it is thus possible to estimate particularly well how a particular need for cleaning of the respective wheel brakes develops over the service lives thereof. In this way, advantageously no additional sensors are required for ascertaining the respective need for cleaning of the respective wheel brakes. In the model, respective braking processes at the wheel brakes can be stored precisely resolved with respect to duration and/or braking pressure, whereby the need for cleaning can be determined with particularly high accuracy for the respective wheel brakes by way of the model.

In some examples, the braking force to be applied to a particular wheel brake by means of the friction braking device is set to be higher, the higher the respective determined need for cleaning at this wheel brake is. This wheel brake can be ground by the braking force that is applied to the particular wheel brake, wherein a grinding effect is higher, the higher the braking force that is applied to this wheel brake is. This means that a particularly high braking force is applied to this wheel brake to be cleaned for particularly good grinding of corrosion, for example. In this way, a particularly good cleaning action can be achieved by applying the braking force to the particular wheel brake.

Turning to FIG. 1, it is provided in in a first method step V1 that a need for cleaning of respective wheel brakes of the friction braking device of the motor vehicle is determined. In the process, the need for cleaning of the respective wheel brakes can in particular be determined by way of a model, as a function of the braking pressure that is applied to the respective wheel brakes and the braking frequency of the particular braking events, in particular over a service life of the wheel brakes.

In a second method step V2 of the method, it is provided that a braking force required for a deceleration of the motor vehicle desired by a driver is determined. For this purpose, a brake pedal position of a brake pedal that is mechanically decoupled from the friction braking device is analyzed, and the desired deceleration is determined as a function of the determined brake pedal position. By pressing the brake pedal into different brake pedal positions, the driver can thus predefine how strongly the motor vehicle is to be decelerated. In the method, it is thus determined how strongly the motor vehicle is to be decelerated according to the driver input, and what braking force is necessary to evoke this deceleration of the motor vehicle. By decoupling the brake pedal from the friction braking device, it is avoided that the driver, beyond resistance of the brake pedal, can feel the braking force being allocated among respective wheel brakes of the friction braking device. Due to the decoupling of the brake pedal from the friction braking device, a brake pedal resistance is identical to the driver for each allocation of the braking force during a desired deceleration characterized by the brake pedal position. In this way, no so-called pedal feel disadvantage arises.

In a third method step V3 of the method, it is provided that a first, predefined portion of this braking force required for the desired deceleration of the motor vehicle is allocated to the regenerative braking device, and the remainder of the required braking force is allocated to the friction braking device. In the process, the portion of the braking force provided by the friction braking device is distributed among the wheel brakes, as a function of the determined need for cleaning of the respective wheel brakes.

In some examples, a maximum possible regenerative power of the regenerative braking device may be selected as the first predefined portion of the braking force, so as to be able to recover as much of the braking energy as possible in order to thereby be able to operate the motor vehicle particularly energy-efficiently. If the braking force that is required for the predefined deceleration of the motor vehicle is smaller than or equal to the maximum possible regenerative power of the regenerative braking device and if, furthermore, the need for cleaning has been determined for at least one wheel brake of the friction braking device, a regenerative power lower than the maximum possible regenerative power of the regenerative braking device is selected as the first predefined portion of the braking force, and the remainder of the required braking force is allocated among the respective wheel brakes of the friction braking device. The higher the particular determined need for cleaning pf a particular wheel brake is, the higher is the braking force that must be applied to this wheel brake to grind grime off this wheel brake.

So as not to jeopardize a stability of the motor vehicle during a braking process, the remainder of the braking force to be allocated among the wheel brakes may be be allocated among the wheel brakes as a function of a predefined stability criterion. It may be predefined that the stability criterion is adhered to when the respective braking force assigned to the wheel brakes corresponds to no more than a maximum braking force for the particular wheel brake and/or a braking force ratio between the respective wheel brakes is within a permitted range for this braking force ratio. It can furthermore be provided that, in the event of an intervention by an anti-lock braking system and/or an electronic stability control program, serving as vehicle dynamics control systems, into the motor vehicle's driving dynamics, the allocation of the braking force between the regenerative braking device and the friction braking device and/or among the wheel brakes are predefined by the vehicle dynamics control system.

In some examples, a larger proportion of the braking force of the friction braking device can be distributed among wheel brakes of all rear wheels of the motor vehicle compared to wheel brakes of respective front wheels of the motor vehicle. If it is established that no need for cleaning of respective wheel brakes exists, the braking force to be allocated among the wheel brakes can be evenly distributed among all wheel brakes.

During a manual braking process, during which the driver of the motor vehicle predefines, by way of the particular brake pedal position, how strongly the motor vehicle is to be decelerated, in the method a hydraulic component of the braking torque, i.e., the braking force required for the desired deceleration of the motor vehicle, is deliberately distributed, within stability boundaries of the motor vehicle, among axles or specifically among individual wheels, such as the wheel brakes of the motor vehicle assigned to the wheels. In this way, an energy input at the wheel brakes to be ground, and thus the grinding action, is to be increased. In this way, it is also possible to transmit a small hydraulic braking torque component, in particular in the case of braking processes having a regenerative component, in a targeted manner to an axle or to defined wheels of the motor vehicle, regardless of a design-based braking force distribution.

Negative influences on a pedal feel can be avoided by using a decoupled brake system since, in this way, the brake pedal is mechanically decoupled from the friction braking device. This decoupled brake system can be a simulator system comprising a travel simulator, which can be configured, for example, as a 1-Box system. The term '1-Box system' describes a design of the brake system, wherein all parts of the brake system are accommodated in a shared housing, and thus in a box. The brake pedal can be connected directly to this box. An electromechanical brake booster, an electronic stability control program and a brake fluid reservoir can be arranged in the shared housing. The simulator system describes one possible form of mechanically decoupling the brake pedal from the friction braking device. Brake fluid displaced by means of the brake pedal can be diverted into the brake fluid reservoir, which can also be referred to as a simulator. This prevents brake fluid from being displaced into the wheel brakes directly by means of the brake pedal. Instead, the braking pressure is built up in the respective wheel brakes by means of a separate motor via respective hydraulic lines.

In the case of a coupled brake system including a vacuum brake booster or an electromechanical brake booster, a brake pedal feel changes drastically as a result of the distribution of the braking force among selected wheels. The brake pedal feel is determined by a ratio of the brake pedal travel or brake pedal force to the deceleration of the motor vehicle. By hydraulically switching off individual wheels during the braking process using the coupled brake system, the driver has to displace less volume of brake fluid in order to generate a predefined pressure in the remaining wheel brakes, due to a steeper travel-pressure characteristic curve in this case. In this case, on the other hand, the predefined deceleration is not reached since a respective generated braking torque overall acts at fewer wheels.

In the decoupled brake system, which can be a brake-by-wire brake system in some examples, the travel-force profile upon actuation of the brake pedal is predefined by the mechanical design, regardless of the hydraulic conditions in the friction braking device. The deceleration for the particular brake pedal position is triggered by a pressure regulator in the friction braking device, which is decoupled from the brake pedal, and can be predefined by software functions so as to be applied in the brake system.

The methods disclosed herein allow a brake pedal feel, and thus a brake pedal travel deceleration behavior, to be adapted so as to correspond to a normal deceleration behavior expected by the driver, corresponding to a deceleration behavior without active braking torque distribution among individual wheels or deceleration across all wheels of the motor vehicle. For this purpose, characteristic curves and/or characteristic maps can be stored in a control device of the brake system for each wheel brake, which map a braking torque at the wheel which arises for an adjusted braking pressure. Using a function in the control device, the brake pedal position representing a driver input can be read in, and a desired sum wheel braking torque can be determined. This desired sum wheel braking torque results from an applied standard brake pedal travel deceleration behavior for a braking process of the motor vehicle across all wheels, that is, without functional intervention. If, during this braking process, individual wheels or axles are now hydraulically disconnected, the function, based on the stored characteristic curves for each wheel brake, ascertains a respective braking pressure to be applied, from which results the desired sum wheel braking torque at the active wheel brakes. This braking pressure to be applied is adjusted at the respective wheel brakes by means of a pressure regulator of the friction braking device. The brake pedal travel deceleration behavior is thus equal to the standard brake pedal travel deceleration behavior, and the active function is not or hardly noticeable to the driver.

In the method, the braking pressure in the friction braking device is measured or calculated. For the function, application parameters can be predefined, which define which wheel brakes and/or axles may be disconnected and/or up to what decelerations the respective wheel brakes and/or axles may be disconnected. As a result of the described function, vehicle stability as well as vehicle safety are to be impaired to a particularly low degree. For this reason, vehicle stability functions or vehicle safety functions have a higher priority. If the function is to be terminated and braking is to take place again across all wheel brakes, the corresponding wheel brakes are enabled via corresponding valves, and the braking pressure is adjusted by way of the pressure regulator corresponding to the desired sum wheel braking torque at all wheels of the motor vehicle. The function can be activated as needed, and thus depending on an estimated state of the wheel brakes.

Due to the deliberate distribution of the hydraulic braking torque component, in particular in the case of braking processes having a regenerative component, among individual axles or wheels, in particular the wheel brakes assigned to these axles or to these wheels, a consumption disadvantage can be avoided. Furthermore, a pedal feel disadvantage can be avoided through the use of this function during manual braking processes. An algorithm can be used for ascertaining and distributing the hydraulic braking torque. This algorithm is used to adapt the deceleration of the motor vehicle as a function of the driver brake input and the respective active wheel brakes, so that the brake pedal feel remains the same for the driver for a given driver brake input, regardless of the respective active wheel brakes.

In a brake control system control device, and thus the control unit of the brake system of the motor vehicle, a driver brake input torque can be divided into a generator component and a hydraulic component, depending on the level of available hydraulic generator torque. Thereafter, the hydraulic component can be distributed among the wheel brakes assigned to the axles or the wheels, which potentially have the highest need for cleaning, and thus have the greatest need for grinding. In the method, a desired sum wheel brake torque that is equivalent across all wheels for a braking process is determined based on the driver brake input, and a braking pressure corresponding to the braking process by way of the selected wheels or axles is calculated based on stored characteristic curves. This braking pressure is adjusted by way of the pressure regulator unit in the friction braking device. In particular, the allocation of the remainder of the required braking force among the wheel brakes of the friction braking device takes place imperceptibly to a driver of the motor vehicle, wherein a stability of the motor vehicle is influenced particularly little, and in particular not at all. The need for cleaning of the respective wheel brakes can be determined based on an algorithm, which can add together energy input for each wheel brake. In principle, disk brakes at a rear axle have a higher need to have grime, in particular corrosion, cleaned off since, during normal operation by the customer, they experience less energy input than the front axle brakes.

Overall, the present disclosure demonstrates how a function for improving friction properties of respective wheel brakes can be achieved in vehicles comprising decoupled brake systems.

LIST OF REFERENCE SIGNS

V1 to V3 respective method steps

The invention claimed is:

1. A method for operating a brake system of a motor vehicle, comprising:
   determining a need for cleaning of respective wheel brakes of a friction braking device;
   determining a deceleration of the motor vehicle desired by the driver, based on (i) a position of a brake pedal that is mechanically decoupled from the friction braking device, and (ii) a braking force that is required for the desired deceleration of the motor vehicle;
   allocating a first, predefined portion of the braking force to a regenerative braking device and allocating a second, predefined portion of the braking force among wheel brakes of the friction braking device; and
   distributing the braking force to be provided by the friction braking device among the wheel brakes as a function of the determined need for cleaning of the respective wheel brakes, wherein distributing the braking force comprises allocating different braking force portions to the wheel brakes based on respective determined cleaning needs of the wheel brakes, such that a wheel brake having a greater determined need for cleaning receives a greater portion of the braking force.

2. The method of claim 1, further comprising:
   determining a hydraulic braking pressure to be applied to a particular wheel brake for adjusting the brake force as a function of the braking force assigned to the particular wheel brake by way of a stored assignment rule.

3. The method of claim 1, wherein the braking force allocated among the wheel brakes of the friction braking device is allocated among the wheel brakes as a function of at least one predefined stability criterion.

4. The method of claim 3, wherein the at least one predefined stability criterion comprises
   (i) determining when the respective braking force assigned to the wheel brakes corresponds to no more than a maximum braking force for the particular wheel brake, and/or
   (ii) a braking force ratio between respective wheel brakes is within a permitted range.

5. The method of claim 1, wherein the allocation of the braking force between the regenerative braking device and the friction braking device and/or among the wheel brakes is predefined by a vehicle dynamics control system.

6. The method of claim 1, wherein the braking force allocated among the wheel brakes is evenly distributed among all wheel brakes, when it is established that no need for cleaning exists.

7. The method of claim 1, further comprising selecting a maximum possible regenerative power of the regenerative braking device as the first predefined portion of the braking force.

8. The method of claim 1, wherein,
   if the braking force that is required for the predefined deceleration of the motor vehicle is smaller than or equal to a maximum possible regenerative power of the regenerative braking device, and
   if the need for cleaning has been determined,
   a regenerative power lower than the maximum possible regenerative power of the regenerative braking device is selected as the first predefined portion of the braking force, and the remainder of the required braking force is allocated as the second, predefined portion to the friction braking device.

9. The method of claim 1, wherein a larger proportion of the braking force of the friction braking device is distributed among wheel brakes of all rear wheels of the motor vehicle, compared to wheel brakes of all front wheels.

10. The method of claim 1, wherein determining the need for cleaning of the respective wheel brakes is determined by way of a model, as a function of a braking frequency and the braking pressure that is applied to the particular wheel brakes over a configured time period.

11. The method of claim 1, wherein the braking force to be applied to a particular wheel brake via the friction braking device is set to be higher when the respective determined need for cleaning at the wheel brake is higher.

12. A method for operating a brake system of a motor vehicle, comprising:
   determining a need for cleaning of respective wheel brakes of a friction braking device;
   determining a deceleration of the motor vehicle desired by the driver, based on (i) a position of a brake pedal that is mechanically decoupled from the friction braking device, and (ii) a braking force that is required for the desired deceleration of the motor vehicle;
   allocating a first, predefined portion of the braking force to a regenerative braking device and allocating a second, predefined portion of the braking force among wheel brakes of the friction braking device, wherein the braking force allocated among the wheel brakes of the friction braking device is allocated among the wheel brakes as a function of at least one predefined stability criterion; and
   distributing the braking force to be provided by the friction braking device among the wheel brakes as a function of the determined need for cleaning of the respective wheel brakes, wherein distributing the braking force comprises allocating different braking force portions to the wheel brakes based on respective determined cleaning needs of the wheel brakes, such that a wheel brake having a greater determined need for cleaning receives a greater portion of the braking force.

13. The method of claim 12, further comprising:
   determining a hydraulic braking pressure to be applied to a particular wheel brake for adjusting the brake force as a function of the braking force assigned to the particular wheel brake by way of a stored assignment rule.

14. The method of claim 12, wherein the at least one predefined stability criterion comprises
    (i) determining when the respective braking force assigned to the wheel brakes corresponds to no more than a maximum braking force for the particular wheel brake, and/or
    (ii) a braking force ratio between respective wheel brakes is within a permitted range.

15. The method of claim 12, wherein the allocation of the braking force between the regenerative braking device and the friction braking device and/or among the wheel brakes is predefined by a vehicle dynamics control system.

16. The method of claim 12, wherein the braking force allocated among the wheel brakes is evenly distributed among all wheel brakes, when it is established that no need for cleaning exists.

17. The method of claim 12, further comprising selecting a maximum possible regenerative power of the regenerative braking device as the first predefined portion of the braking force.

18. The method of claim 12, wherein,
    if the braking force that is required for the predefined deceleration of the motor vehicle is smaller than or equal to a maximum possible regenerative power of the regenerative braking device, and
    if the need for cleaning has been determined,
    a regenerative power lower than the maximum possible regenerative power of the regenerative braking device is selected as the first predefined portion of the braking force, and
the remainder of the required braking force is allocated as the second, predefined portion to the friction braking device.

19. The method of claim 12, wherein a larger proportion of the braking force of the friction braking device is distributed among wheel brakes of all rear wheels of the motor vehicle, compared to wheel brakes of all front wheels.

20. A method for operating a brake system of a motor vehicle, comprising:
    determining a need for cleaning of respective wheel brakes of a friction braking device;
    determining a deceleration of the motor vehicle desired by the driver, based on (i) a position of a brake pedal that is mechanically decoupled from the friction braking device, and (ii) a braking force that is required for the desired deceleration of the motor vehicle;
    allocating a first, predefined portion of the braking force to a regenerative braking device and allocating a second, predefined portion of the braking force among wheel brakes of the friction braking device, wherein the allocation of the braking force between the regenerative braking device and the friction braking device and/or among the wheel brakes is predefined by a vehicle dynamics control system; and
    distributing the braking force to be provided by the friction braking device among the wheel brakes as a function of the determined need for cleaning of the respective wheel brakes, wherein distributing the braking force comprises allocating different braking force portions to the wheel brakes based on respective determined cleaning needs of the wheel brakes, such that a wheel brake having a greater determined need for cleaning receives a greater portion of the braking force.

\* \* \* \* \*